(12) United States Patent
Kumar et al.

(10) Patent No.: US 9,269,047 B2
(45) Date of Patent: Feb. 23, 2016

(54) RULE-BASED SELECTION OF CONTENT

(75) Inventors: Shiv Kumar, Marlboro, NJ (US); Paritosh Bajpay, Edison, NJ (US); John Michael Donovan, San Antonio, TX (US); Narendra Ravi, Howell, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 297 days.

(21) Appl. No.: 12/964,528

(22) Filed: Dec. 9, 2010

(65) Prior Publication Data

US 2012/0151527 A1 Jun. 14, 2012

(51) Int. Cl.
| | |
|---|---|
| G06F 3/00 | (2006.01) |
| G06F 13/00 | (2006.01) |
| H04N 5/445 | (2011.01) |
| H04H 60/32 | (2008.01) |
| H04N 7/173 | (2011.01) |
| G06N 5/04 | (2006.01) |
| H04N 21/466 | (2011.01) |
| H04N 21/482 | (2011.01) |

(52) U.S. Cl.
CPC ........... G06N 5/047 (2013.01); H04N 21/4667 (2013.01); H04N 21/4668 (2013.01); H04N 21/482 (2013.01); H04N 21/4826 (2013.01)

(58) Field of Classification Search
CPC ...................................................... H04N 21/45
See application file for complete search history.

(56) References Cited

U.S. PATENT DOCUMENTS

| | | | |
|---|---|---|---|
| 6,934,964 B1 | 8/2005 | Schaffer et al. | |
| 7,100,184 B1 * | 8/2006 | Kahn | 725/39 |
| 7,370,342 B2 | 5/2008 | Ismail et al. | |
| 2002/0078453 A1 | 6/2002 | Kuo | |
| 2002/0083468 A1 * | 6/2002 | Dudkiewicz | 725/133 |
| 2002/0104087 A1 * | 8/2002 | Schaffer et al. | 725/46 |
| 2003/0172175 A1 * | 9/2003 | McCormack et al. | 709/232 |
| 2006/0026635 A1 * | 2/2006 | Potrebic et al. | 725/37 |
| 2006/0026642 A1 * | 2/2006 | Schaffer et al. | 725/46 |
| 2006/0212900 A1 * | 9/2006 | Ismail et al. | 725/34 |
| 2007/0089129 A1 * | 4/2007 | Verhaegh et al. | 725/35 |
| 2007/0157249 A1 * | 7/2007 | Cordray et al. | 725/58 |

(Continued)

FOREIGN PATENT DOCUMENTS

CN 101656850 A * 2/2010 ............. H04N 5/445

OTHER PUBLICATIONS

Schneier, Bruce. "The Rete Matching Algorithm", Dec. 5, 2002, DrDobb's, [Retrieved on Sep. 19, 2012]. Retrieved from the Internet <http://www.drdobbs.com/architecture-and-design/the-rete-matching-algorithm/184405218>.*

(Continued)

Primary Examiner — Nathan Flynn
Assistant Examiner — William J Kim
(74) Attorney, Agent, or Firm — Toler Law Group, PC

(57) ABSTRACT

A method includes, at a customer premise equipment (CPE) device, accessing data descriptive of content available via a network coupled to a network interface of the CPE device. A plurality of rules are analyzed using a forward-inferencing rules engine to determine whether one or more of the rules are satisfied based on the data. The rules include at least one user-defined rule and at least one automatically generated rule, where the at least one automatically generated rule is automatically generated based on user history information. The method includes selecting particular content of the content available via the network for presentation via a display device.

20 Claims, 6 Drawing Sheets

(56) References Cited

U.S. PATENT DOCUMENTS

| | | | |
|---|---|---|---|
| 2008/0209325 A1* | 8/2008 | Suito et al. | 715/719 |
| 2008/0235725 A1* | 9/2008 | Hendricks | 725/35 |
| 2009/0100469 A1* | 4/2009 | Conradt et al. | 725/46 |
| 2009/0132546 A1* | 5/2009 | Kurata et al. | 707/10 |
| 2009/0197681 A1* | 8/2009 | Krishnamoorthy et al. | 463/42 |
| 2010/0122296 A1* | 5/2010 | Beyabani et al. | 725/46 |
| 2010/0205628 A1 | 8/2010 | Davis et al. | |
| 2011/0197230 A1* | 8/2011 | Yu et al. | 725/40 |

OTHER PUBLICATIONS

Collet, et al. "Creating a Portal for IP-TV Using WebSphere Portal", IBM WebSphere Developer Technical Journal, Apr. 19, 2006, 14 pp.

Boxee Support: Quick Overview of Boxee Features from http://boxee.zendesk.com/entries/171655-quick-overview-of-boxee-features, viewed Oct. 18, 2010, 4 pp.

Boxee Suport: Home Screen from http://boxee.zendesk.com/entries/173799-home-screen, viewed Oct. 18, 2010, 2 pp.

Google TV "There's more on TV than television" from http://www.google.com/tv/features.html, viewed Oct. 18, 2010, 5 pp.

Google TV Ads: Getting Started Guide—"Tv Ads Strategy Guide" from http://www.google.com/adwords/tvads/guide/index.html, 2010, 11 pp.

Doorenbos, Robert B., "Production Matching for Large Learning Systems", Ph.D Thesis, Computer Science Department, Carnegie Mellon University, Pittsburgh, PA, Jan. 31, 1995, 208 pp.

U.S. Appl. No. 12/727,931, filed Mar. 19, 2010.

Forgy, Charles L "Rete: A Fast Algorithm for the Many Pattern/Many Object Pattern Match Problem", Artificial Intelligence, vol. 19, pp. 17-37, 1982.

* cited by examiner

RULE-BASED SELECTION OF CONTENT

BACKGROUND

A content delivery system may present a user with more content options than can be processed by the user in a reasonable amount of time. As a result, it may be difficult for the user to quickly and easily locate content that the user is interested in. For example, when the user has not previously decided what television program to watch, it may be time-consuming for the user to go through a channel listing to find a television program that the user will be interested in watching.

DETAILED DESCRIPTION

Figure 1:
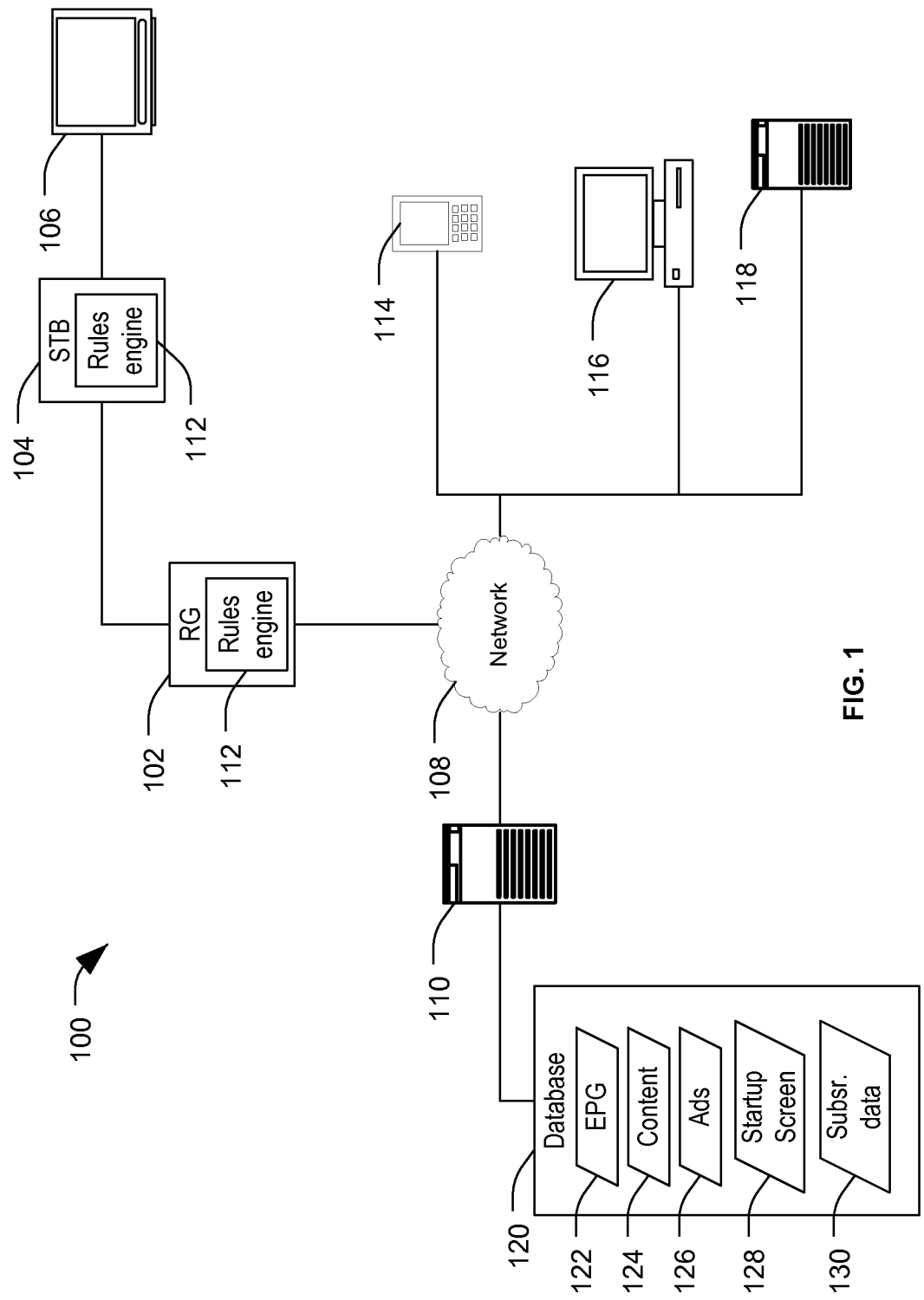
FIG. 1 is a diagram to illustrate a particular embodiment of a system operable to perform rule-based selection of content.

Disclosed embodiments enable improved user interaction with media content available via a content provider system. For example, disclosed embodiments may include a set-top box, a residential gateway, or another customer premise equipment (CPE) device that enables customization of a user experience in connection with media content that is available via a content provider. To illustrate, the CPE device may include a set-top box device, a residential gateway device, a television device, a network interface device, a modular card (e.g., a functional expansion unit), a micro cell, or another CPE device that enables rules based selection of content and customization of a user experience.

In a particular embodiment, a customer premise equipment (CPE) device includes a network interface, a processor coupled to the network interface, and a memory accessible to the processor. The memory includes instructions executable by the processor to access data descriptive of content available via a network coupled to the network interface. The instructions are also executable by the processor to analyze a plurality of rules using an inferencing rules engine to determine whether one or more of the rules are satisfied based on the data. The rules include at least one user-defined rule and at least one automatically generated rule, where the at least one automatically generated rule is automatically generated based on user history information. The instructions are further executable to select particular content of the content available via the network for presentation via a display device.

In another particular embodiment, a method includes, at a customer premise equipment (CPE) device, accessing data descriptive of content available via a network coupled to a network interface of the CPE device. The method also includes analyzing a plurality of rules using an inferencing rules engine to determine whether one or more of the rules are satisfied based on the data. The rules include at least one user-defined rule and at least one automatically generated rule, where the at least one automatically generated rule is automatically generated based on user history information. The method further includes selecting particular content of the content available via the network for presentation via a display device.

In another particular embodiment, non-transitory processor-readable medium includes instructions that, when executed by a processor, cause the processor to, at a customer premise equipment (CPE) device, generate user history information by monitoring actions of a user, wherein the actions indicate that the user frequently accesses a particular program at a particular time. The instructions are also executable to access data descriptive of content available via a network coupled to a network interface of the CPE device. The instructions are further executable to analyze a plurality of rules using a forward-inferencing rules engine to determine whether one or more of the rules are satisfied based on the data. The rules include at least one user-defined rule and at least one automatically generated rule, where the at least one automatically generated rule is automatically generated based on user history information. The instructions are executable to select particular content of the content available via the network for presentation via a display device. In one example, the particular content includes content associated with a social network.

FIG. 1 illustrates a particular embodiment of a system to customize a user experience with media content. The system 100 includes a residential gateway (RG) 102 coupled to a set-top box device (STB) 104 that provides media content to a display device, such as an illustrative television 106. The residential gateway 102 may be coupled to a content provider server 110 via a network 108. In a particular embodiment, the network 108 may include an access network of an Internet Protocol Television (IPTV) system or an access network of another television system, such as a cable provider television network or a satellite television network.

One or both of the residential gateway 102 and the set-top box device 104 may include a rules engine 112. For example, in the particular embodiment depicted in FIG. 1, both the residential gateway 102 and the set-top box device 104 include the rules engine 112. The rules engine 112 may be adapted to facilitate user-customized interaction with content provided via the content provider server 110. In a particular embodiment, the rules engine 112 is an inferencing rules engine such as a forward-inferencing rules engine or other inferencing rules engine. For example, the rules engine 112 may include a forward-reasoning rules-based system that may improve a customer experience involved in accessing content via the content provider server 110.

In a particular embodiment, the rules engine 112 may implement a Rete algorithm or variant thereof (e.g., a Rete I algorithm, a Rete II algorithm, Rete III algorithm or some other Rete-based algorithm). The Rete algorithm may access automatically generated rules as well as user-defined or user edited rules in order to improve the user interaction with the content. The Rete algorithm may enable the rules engine 112 to process both user-defined rules and automatically generated rules in a single pass. Further, the Rete algorithm may improve the speed of processing rules when a large quantity of information or data is to be matched against particular rules. Thus, the Rete algorithm may be preferable to other types of rule-based systems, such as neural networks (which utilize automatically generated rules but not user-defined rules) and expert systems (which may require multiple rules engines in order to process both user-defined rules and automatically generated rules). In a particular embodiment, the rules engine 112 is adapted to access data that is descriptive of content available via the network 108 from the content provider 110. The rules engine 112 may analyze the data using a forward-inferencing rules engine to determine whether one or more rules are satisfied based on the data. As previously mentioned, the rules may include one or more user-defined rules and one or more automatically generated rules. Further, the rules engine 112 may be adapted to automatically generate additional rules based on observed interactions between a user and the set-top box device 104, the residential gateway 102, a personal communication device (e.g., a mobile communication device 114), or a computing device 116.

The rules engine 112 may also automatically select content for display at the television 106. For example, the content provider server 110 may have access to a database 120 that includes information such as an electronic program guide (EPG) 122, media content 124, advertisements 126, a startup screen 128, other media content, or any combination thereof. When the rules engine 112 selects particular media content, such as the EPG 122, the content 124, the advertisements 126, or the startup screen 128, the particular media content is presented via the television 106.

In a particular embodiment, the rules engine 112 is further operable to automatically generate additional rules (e.g., based on viewing habits and actions). For example, the rules engine 112 may track programs recorded (e.g., at a local or network-based digital video recorder (DVR)) by the user. The rules engine 112 may also track how much of a program is watched by the user, which particular channels are watched by the user, and program names, days of the week, and times of day that programs are watched by the user.

In a particular embodiment, the viewing habits are captured by the set-top box device 104, the residential gateway 102, or both, and uploaded by the rules engine 112 to the content provider server 110 for storage or generation of rules. For example, the content provider server 110 may have access to additional information about programs that is not typically provided via the EPG 122, and the user interaction history may be uploaded to the content provider server 110 for processing with respect to the particular program content information that is not included in the EPG 122 to determine additional subtleties to particular rules. For example, the content provider server 110 may recognize that the user watched a baseball every five to six days, may determine that a particular pitcher was the scheduled starter in each of those baseball games, and may therefore generate a rule indicating that the user is a fan of the particular starting pitcher. If the starting pitcher is subsequently traded to a new team and the user is not aware of the trade, the newly generated rule may alert the user to the starting pitcher's next start with the new team. For example, short message service (SMS) alerts and/or e-mail alerts may be generated in response to determining that a new television episode or sporting event matching user preferences is scheduled.

The rules engine 112 or the content provider server 110 may also generate alerts to other devices, such as the mobile communication device 114 or the computing device 116. For example, the alerts may indicate when particular programs are available or may provide other information. The content provider server 110 may also use the rules engine 112 associated with a particular user, subscriber data 130 associated with a particular user, or user interaction information to support targeted marketing of particular non-media items to the user. For example, if the content provider server 110 determines that the particular user is a fan of a particular sports team, the content provider server 110 may provide targeted advertisements 126 for sporting events tickets or sports memorabilia (e.g., jerseys, pennants, or other non-media items).

In a particular embodiment, the set-top box device 104, the residential gateway 102, and the television 106 may be used by more than one user (e.g., members of a family or roommates/housemates). Accordingly, the rules engine 112 may include or be associated with an authentication module that determines a user identification of the user. Thus, the rules engine 112 may include rules associated with multiple users, and based on authentication information, the rules engine 112 may refer to a particular set of rules that is associated with the identified user that is currently using the set-top box device 104, the residential gateway 102, and/or the television 106.

During one example of operation, in response to the set-top box device 104 and the television 106 being powered on, the rules engine 112 may select particular content for display at the television 106. To illustrate, the rules engine 112 may select the startup screen 128 for a particular user and may present the startup screen at the television 106. The startup screen 128 may include data of the electronic program guide data 122, where the data is sorted in a particular order that is based on rules associated with the particular user. As another example, the startup screen 128 may include other content (e.g., advertisements) that is selected based on rules associated with the particular user. Additionally, the startup screen 128 or other content may be displayed via the television 106 in response to selection by the rules engine 112 based on subscriber data 130. For example, the subscriber data 130 may include current account balances, user identification information, or information about other communication devices associated with the user (e.g., mobile communication device 114 or the computing device 116). The subscriber data 130 may also include information about other subscriber systems associated with the user, such as information about memberships to particular social groups, social networks, or social media groups a social media group associated with a server 118).

In an example of operation, the rules engine 112 determines a time at which the set-top box device 104 or the television 106 is powered on. In response to the time and particular rules, the rules engine 112 may select content for display at the television 106. To illustrate, when a user powers on the set-top box device 104 or the television 106, the rules engine 112 may determine particular programs that are currently being transmitted from the content provider. For example, a program that the user frequently watches may be available or about to become available via a transmission. In response to determining that the frequently watched program is available or about to become available, the rules engine 112 may select the program for display. The television 106 may be tuned to a channel associated with the frequently watched program so that upon power up, the user is able to immediately view the program. In another illustrative example, the rules engine 112 may tune the television 106 to a startup screen (e.g., the startup screen 128) that includes alerts to notify the user that the frequently watched program is about to begin.

In another example, the program may not be a frequently watched program. For example, the program may have never been watched by the user. The rules engine 112 may determine that the program includes content that is similar to content viewed by the user, and may in response "recommend" the program to the user. To illustrate, the program may include a live transmission of a basketball game. Accordingly the user may not have previously viewed that particular basketball game. However, based on a rule indicating that the user frequently watches sporting events, particular types of sporting events, or sporting events associated with a particular team, the rules engine 112 may determine that the user may be interested in the live transmission of the basketball game. In response, the rules engine 112 may immediately tune the television 106 to the live transmission of the basketball game upon startup of the set-top box device 104 and/or the television 106. Alternately, the rules engine 112 may cause the television 106 to display an alert that the live transmission of the basketball game is available or about to become available. Further, when the rules engine 112 "recommends" a program based on an automatically generated rule, the rules engine 112 may prompt the user to add the particular program to a list of preferences. For example, the list of preferences may be used by the rules engine 112 to automatically generate additional rules.

In yet another example of operation, the rules engine 112 may determine that prior to the set-top box device 104 or the television 106 being powered on, a transmission of a program frequently watched by the user has ended. For example, the rules engine 112 may determine that the user "missed" a new episode of a situational comedy program (sit-com) frequently watched by the user. Since the user did not view the episode, the rules engine 112 may select, and cause to be displayed at the television 106, content including an alert indicating that the new episode was missed. The content may also include a prompt that provides the user with an option access a recorded version of the episode from the content provider 110. For example, the episode may be stored by the content provider (e.g., as the stored content 124) and may be available on-demand.

In an alternate example of operation, in response to the set-top box device 104 or the television 106 being powered on the rules engine 112 may present a dynamically generated and/or sorted EPG using the EPG data 122. The EPG may be sorted based on rules accessible to and/or generated by the rules engine 112. To illustrate, a user may indicate via a user-defined rule that a particular channel is to be displayed at the top of the EPG. Accordingly, the particular channel may be displayed on top of the EPG presented by the rules engine 112. Other content within the EPG may also be sorted based on other rules. For example, other content within the EPG may be ordered due to an automatically generated rule at the rules engine 112. For example, in response to observing that the user frequently views news channels, the rules engine 112 may automatically generate a rule that causes news channels to be moved to the top of the EPG.

In another illustrative example of operation, upon power up of the set-top box device 104 or the television 106, the rules engine 112 may select particular content from a social media group or social network (e.g., available via the server 118) with which the user is associated. For example, when the server 118 includes a particular content item that is related to other content items in which the user has previously shown interest, the rules engine 112 may select the particular item for display at the television 106. As another example, upon detecting that a social media group is related to previous user interactions related to programs frequently watched by the user), the rules engine 112 may prompt the user with an option to join the social media group or social network associated with the particular content. To illustrate, if the user frequently watches a reality television program, and the rules engine 112 determines that a social network-based fan club exists for the reality television program, the rules engine 112 may prompt the user to sign up to participate in the social network and/or join the fan club. As yet another example, the rules engine 112 may consider program selections made by "friends" of the user (e.g., other people on one or more social networks that the user has associated themselves with) when determining program preferences and recommendations.

In another embodiment of operation, the rules engine 112 may select a predefined user profile of a user in response to detecting that one or more of the residential gateway 102, the set-top box device 104, and the television 106 has been powered on. Based on the user profile, the rules engine 112 may select the startup screen 128 for display at the television 106. The startup screen 128 may include content responsive to a current time of day, day of the week, previously detected user interactions, and scheduled content (e.g., content listed in the electronic program guide data 122). The rules engine 112 may also select a live program for immediate display at the television 106. Alternately, or in addition, pre-recorded programs or user prompts may be displayed at the television 106. For example, a list of programs that were transmitted within the last week, that were not viewed by the user, and that are available on-demand may be presented immediately at the television 106 or the user may be prompted to view the list of programs.

It will be appreciated that the system 100 of FIG. 1 may enable a user to interact with content in a manner that is customized for particular user based on a combination of user-defined rules and automatically generated rules. The system 100 of FIG. 1 may thus enable providers (e.g., IPTV, cable, or satellite providers) to provide a simplified, customized, and enjoyable user experience.

Figure 2:
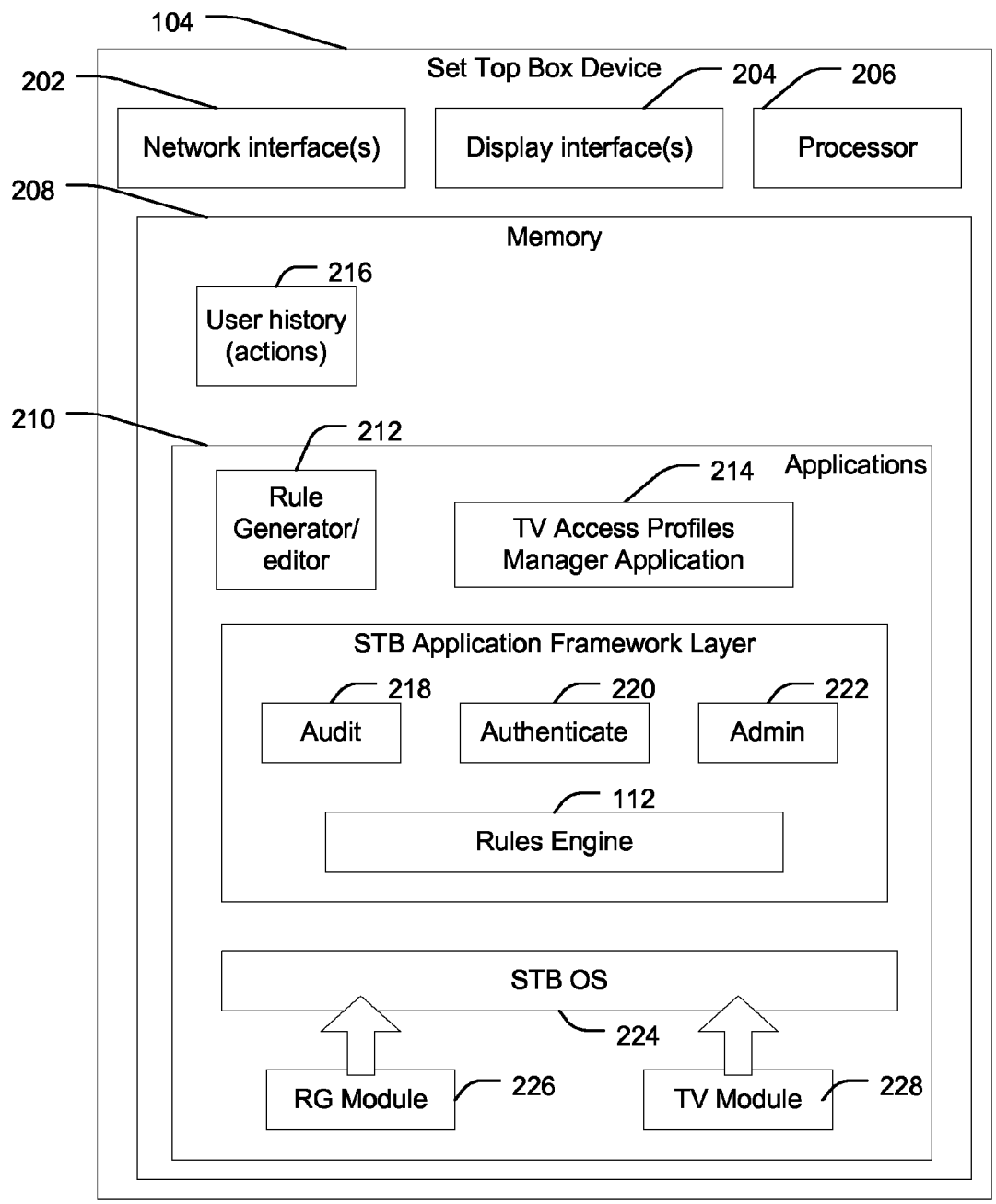
FIG. 2 is a diagram to illustrate particular embodiment of the set-top box device of FIG. 1

FIG. 2 illustrates a particular embodiment of a set-top box device, such as the set-top box device 104 of FIG. 1. The set-top box device 104 includes one or more network interfaces 202 adapted to communicate with a network (e.g., the network 108 of FIG. 1) to receive media content from a content provider (e.g., via the content provider server 110 of FIG. 1). The network interface 202 may further be used to provide information to the content provider regarding user interaction history and actions 216. The set-top box device 104 may further include a display interface 204 adapted to provide display information to a display device, such as the television 106 of FIG. 1. The set-top box device 104 may further include a processor 206. The processor 206 may be adapted to perform various functions of the set-top box device 104, such as to implement one or more applications 210 from a memory 208 of the set-top box device 104. To illustrate, the processor 206 may be adapted to provide processed media via the display interface 204 to a display device.

The applications 210 may include a television access profile manager application 214. The television access profile manager application 214 may observe user actions with respect to the set-top box device 104 and store the user actions as the user history 216. The applications 210 may also include a rule generator and editor 212. The rule generator/editor 212 may be adapted to generate one or more rules for execution by a rules engine (e.g., the rules engine 112 of FIG. 1) based on the user history 216. Additionally, the rule generator/editor 212 may be adapted to provide a user interface to enable a user to generate or define user-defined rules.

The applications 210 may also include a set-top box operating system (STB OS) 224. The set-top box operating system 224 may include instructions executable by the processor 206 to perform basic functions of the set-top box device 104, such as interactions with a residential gateway (e.g., the residential gateway 102 of FIG. 1) formatting, display, and processing of media content, and tuning to particular channels. The applications 210 may further include a residential gateway module 226 that provides an interface for communication with the residential gateway. The applications 210 may also include a television module 228 that provides information to enable interfacing with a television (e.g., the television 106 of FIG. 1) via the display interface 204.

The applications 210 may include an authentication module 220 that is adapted to provide access control to the set-top box device 104 for particular users or to identify a particular user based on user credentials, such as a user identifier and a password. The applications 310 may additionally include an audit module 218 and an admin module 222.

In a particular embodiment, the set-top box device 104 may implement the rules engine 112 of FIG. 1. In such an embodiment, the set-top box device 104 may track user interactions and history, automatically generate rules, and execute a Rete algorithm that processes automatically generated rules and user-defined rules to select content to be displayed via the display interface 204.

Figure 3:
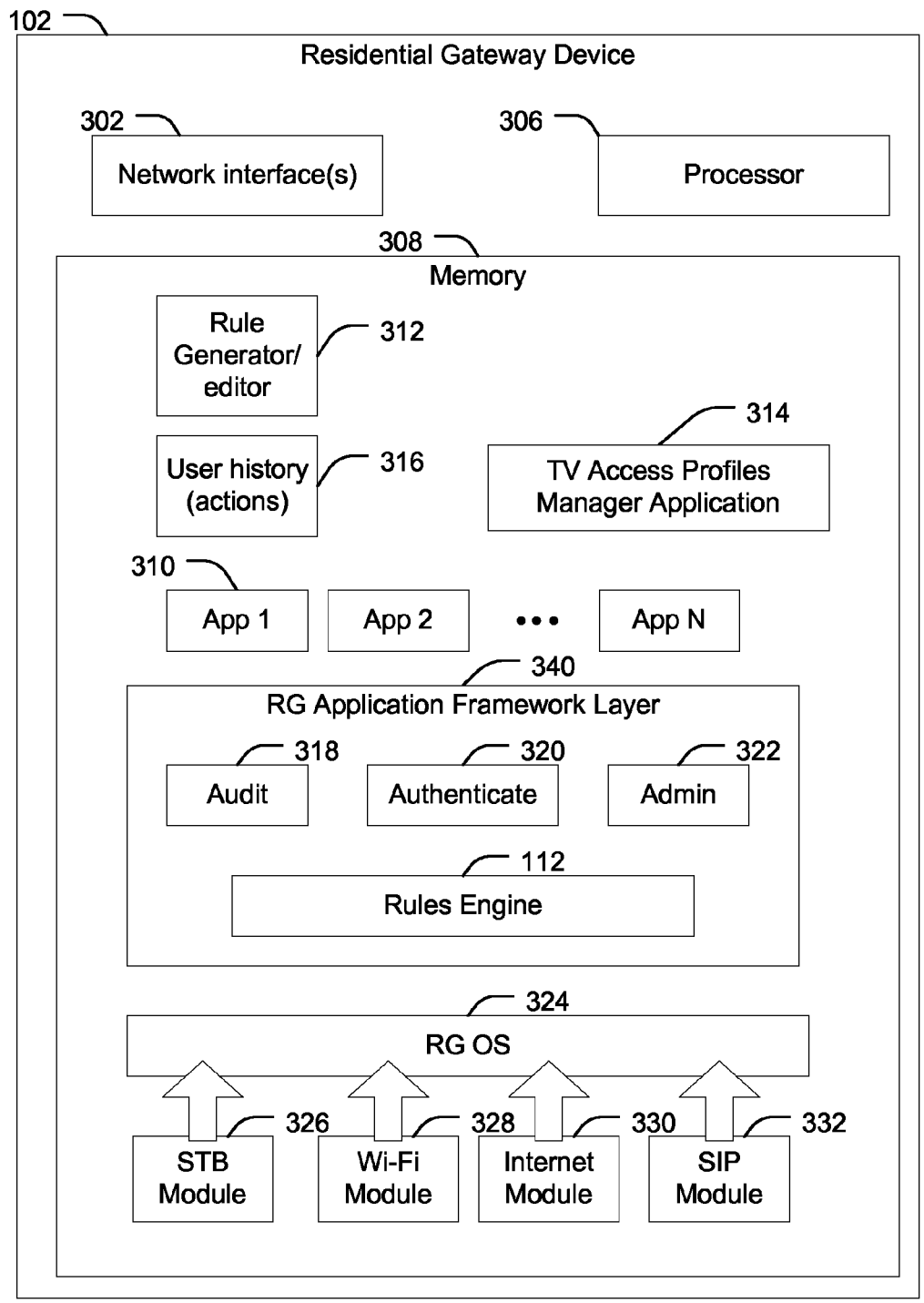
FIG. 3 is a diagram to illustrate a particular embodiment of the residential gateway of FIG. 1.

FIG. 3 illustrates a particular embodiment of a residential gateway device, such as the residential gateway 102 of FIG. 1. The residential gateway 102 includes one or more network interfaces 302 adapted to communicate with a network (e.g., the network 108 of FIG. 1) to receive media content from a content provider (e.g., via the content provider server 110 of FIG. 1). The network interface 302 may further be used to provide information to the content provider regarding user interaction history and actions 316. In a particular embodiment, the residential gateway 102 transmits content to a set-top box device (e.g., the set-top box device 104 of FIG. 1), and the set-top box device transmits the received content for display to a display device (e.g., the television 106 of FIG. 1) via a display interface (e.g., the display interface 204 of FIG. 2). The residential gateway 102 may further include a processor 306. The processor 306 may be adapted to perform various functions of the residential gateway 102, such as to implement one or more applications 310 from a memory 308.

The applications 310 may include a television access profile manager application 314. The television access profile manager application 314 may observe user actions and may store the user actions as the user history 316. The applications 310 may also include a rule generator and editor 312. The rule generator/editor 312 may be adapted to generate one or more rules for execution by a rules engine (e.g., the rules engine 112 of FIG. 1) based on the user history 316. Additionally, the rule generator/editor 312 may be adapted to provide a user interface to enable the user to generate or define user-defined rules.

The applications 310 may also include a residential gateway operating system (RG OS) 324. The residential gateway operating system 324 may include instructions executable by the processor 306 to perform basic functions of the residential gateway 102, such as interactions with a set-top box device (e.g., the set-top box device 104 of FIG. 1), interactions with other devices on a local network, and interactions with devices outside the local network. The applications 310 may further include a STB module 326 that provides an interface for communication with a set-top box device. The applications 310 may also include a Wi-Fi module 328 to enable wireless interfacing with devices (e.g., devices 114, 116 of FIG. 1), an Internet module to provide Internet access to devices, and a session initiation protocol (SIP) module 332.

The memory 308 may also store an application framework layer 340 that includes an authentication module 320 that is adapted to provide access control to the residential gateway 102 for particular users or to identify a particular user based on user credentials, such as a user identifier and a password. The application framework layer 340 may additionally include an audit module 318 and an admin module 322.

In a particular embodiment, the residential gateway 102 may implement the rules engine 112 of FIG. 1. In such an embodiment, the residential gateway 102 may track user interactions and history, automatically generate rules, and execute a Rete algorithm that processes automatically generated rules and user-defined rules to select content to be displayed at a display device.

Figure 4:
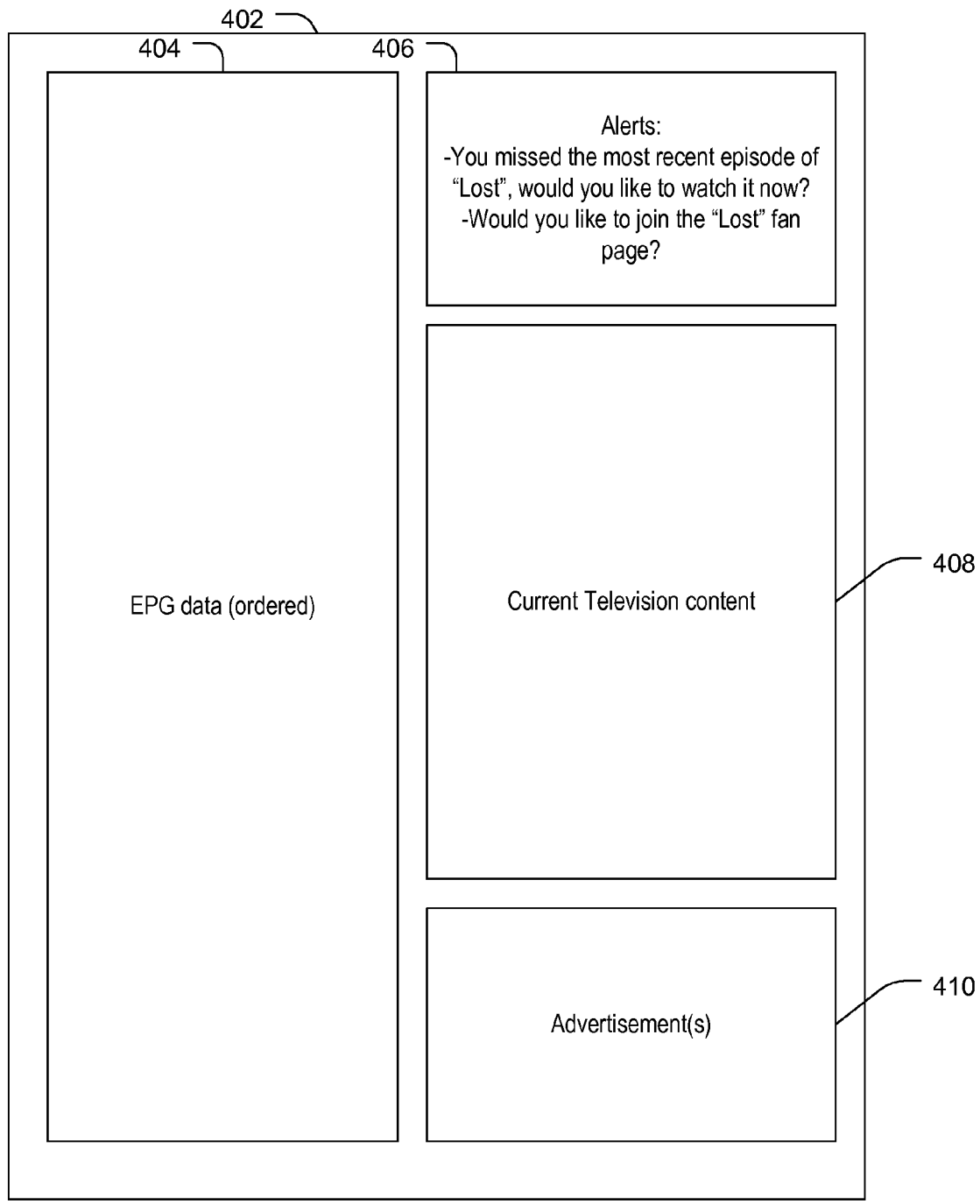
FIG. 4 is a diagram to illustrate a particular embodiment of an interface generated by one of the rules engines of FIG. 1.

FIG. 4 illustrates a particular embodiment of a media interface display 402 that may be generated by a rules engine (e.g., the rules engine 112 of FIG. 1). In a particular embodiment, the rules engine may generate the display, at 402, in response to startup of a set-top box device, a residential gateway device, another CPE device, or a television. In another example, the rules engine may generate the display 402 in response to identifying a particular user, such as when a particular user signs in at a device that is associated with or implementing the rules engine.

The display 402 includes content selected based on rules executed by the rules engine. For example, the display 402 may include electronic program guide (EPG) data 404. The EPG data 404 may include particular EPG entries (e.g., entries for particular programs or entries for particular times) that are based on automatically generated rules, user-defined rules, or both. In another example, the EPG data 404 may be sorted in a particular order based on the automatically generated rules, user-defined rules, or both.

The display 402 may also include one or more alerts 406. For example, the alerts 406 may include information indicating that a particular program is scheduled to start at a particular time. The alerts 406 may also include information indicating that a particular program was missed. For example, the alerts 406 may indicate that a program that the user frequently watches or a "recommended" program that is similar to previously detected user interests has started, is about to start, or has ended but is available via recorded media. In another example, the display 402 may include a prompt to request that the user join a social media group, such as a fan page associated with a program that the user has a demonstrated interest in. Alternately, the fan page may be associated with an actor or genre of the program.

The display 402 may also include particular media content such as current television content 408. For example, the current television content 408 may be selected based on a user interest and immediately displayed as part of the display 402. The display 402 may also include one or more advertisements 410. For example, the advertisements 410 may be selected based on user interest or user-defined rules. In various embodiments, the display 402 may include more or fewer windows than the display elements illustrated in FIG. 4. For example, in particular embodiments, the electronic program guide data 404 may not be present. In other examples, the electronic program guide data 404 may be the only element present in the display 402. Likewise, in particular embodiments, the alerts 406 may not be present. Alternately or in addition, in particular embodiments, the alerts 406 may be the only element presented in the initial display screen 402. Similarly, the current television content 408 or the advertisements 410 may not be present or may be the only elements present. Moreover, one or more of the elements of the display 402 may immediately be presented to a user upon powering up of a set-top box device, a residential gateway, and or a television.

Figure 5:
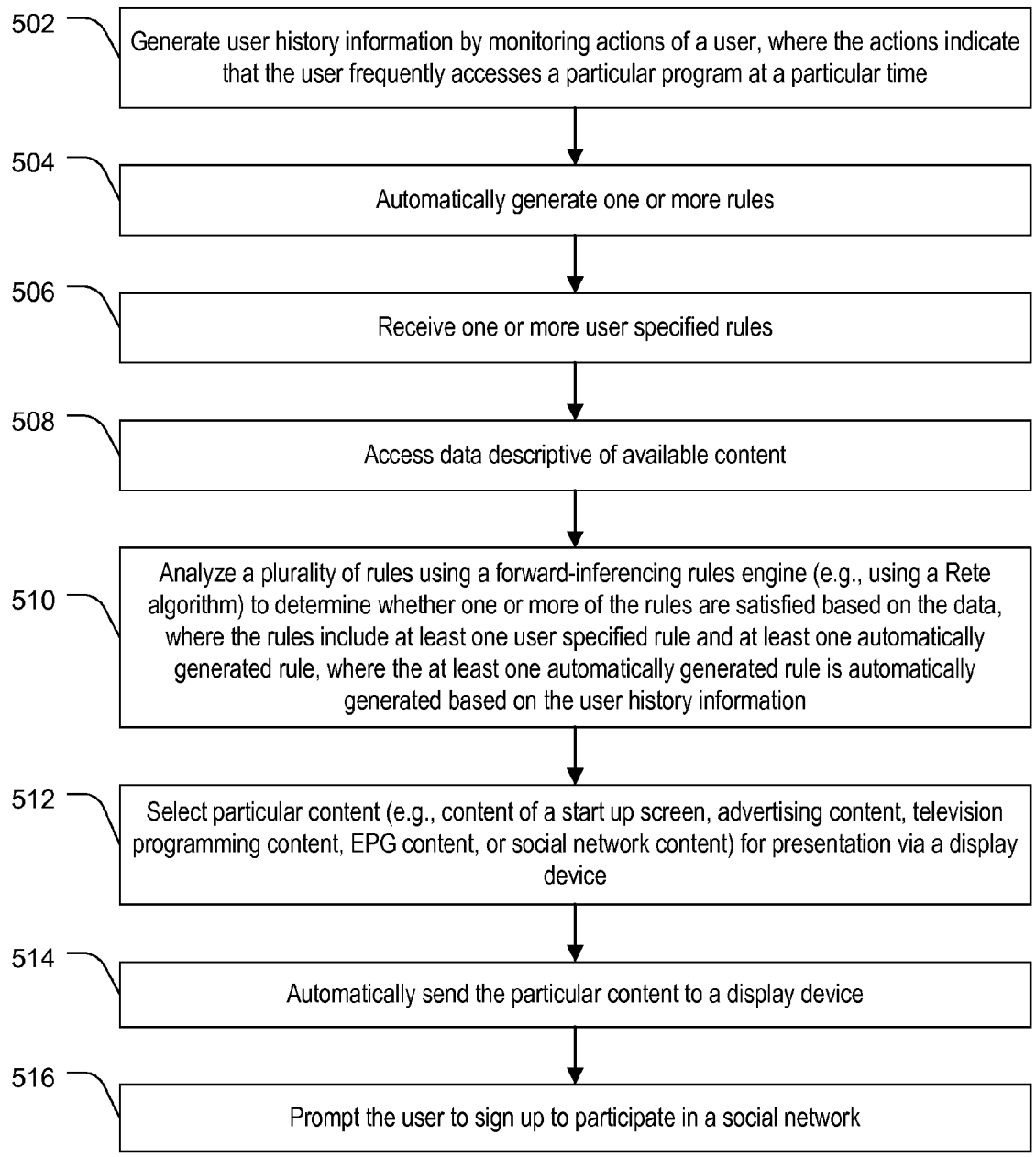
FIG. 5 is a flow diagram to illustrate a particular embodiment of a method of performing rule-based selection of content.

FIG. 5 illustrates a flow chart of a particular embodiment of a method selecting particular content for display. In an illustrative embodiment, the method may be performed at the system 100 of FIG. 1.

The method may include, at 502, generating user history information by monitoring actions of a user. For example, user interaction with a set-top box device, a residential gateway, a communication device, such as a computer or mobile telephony device, or interactions with other devices may be monitored to generate the user history information. The actions may indicate, for example, that a user frequently accesses a particular program at a particular time, frequently accesses a particular type of program, or may indicate other user interests that are determined based on processing and analyzing the user history information. For example, in FIG. 1, the rules engine 112 may generate user history information.

The method may also include, at 504, automatically generating one or more rules based on the user history information. For example, in FIG. 1, the rules engine 112 may automatically generate one or more rules based on the user history information.

The method may further include, at 506, receiving one or more user-defined rules. For example, the user-defined rules may include user selections indicating particular programs of interest, particular types of programs, preferred program schedules, genres, ratings, actors, directors, athletes, or other interests. To illustrate, in FIG. 1, the rules engine 112 may receive one or more user-defined rules.

The method may include, at 508, accessing data descriptive of available content. For example, the data descriptive of available content may include electronic program guide (EPG) data or other information that is not typically included in EPG data. To illustrate, EPG data may be descriptive of content that is scheduled for transmission or broadcasting, and the other information may include data descriptive of video-on-demand (VOD) content and previously broadcast or transmitted television content. In a particular embodiment, the other information also includes data descriptive of content available via a social network. For example, in FIG. 1, the rules engine 112 may access data descriptive of content available via one or more of the server 110, the database 120, and the server 118.

The method may also include, at 510, analyzing a plurality of rules using a forward-inferencing rules engine. For example, in FIG. 1, the forward-inferencing rules engine may include the rules engine 112. In a particular embodiment, the forward-inferencing rules engine uses a Rete algorithm to determine whether one or more of the plurality of rules one are satisfied by the data descriptive of the available content. In particular, the forward-inferencing rules engine may utilize user-defined rules as well as automatically generated rules in a single pass.

The method may further include, at 512, selecting particular content for presentation via a display device. The particular content selected may include content of a startup screen presented in response to a set-top box device or a television device being turned on, advertising content, EPG content (e.g., sorted or filtered based on the one or more rules), social network content, or any combination thereof. In another example, the particular content may include content displayed in response to a user logging into or presenting access credentials to a set-top box device. In another example, the content may be displayed in response to a particular time threshold being reached. For example, the content may include one or more alerts that are presented in response to determining that a time when a program that the user frequently watches is about to begin.

The method may include, at 514, automatically sending particular content to a display device. For example, in FIG. 1, the particular content may be displayed at the television 106. Additionally, or in the alternative, the method may include prompting the user to sign up to participate in a particular social network related to the particular content, at 516. For example, in FIG. 1, the television 106 may display a prompt that provides an option to sign up to participate in a social network accessible via the server 118.

Figure 6:
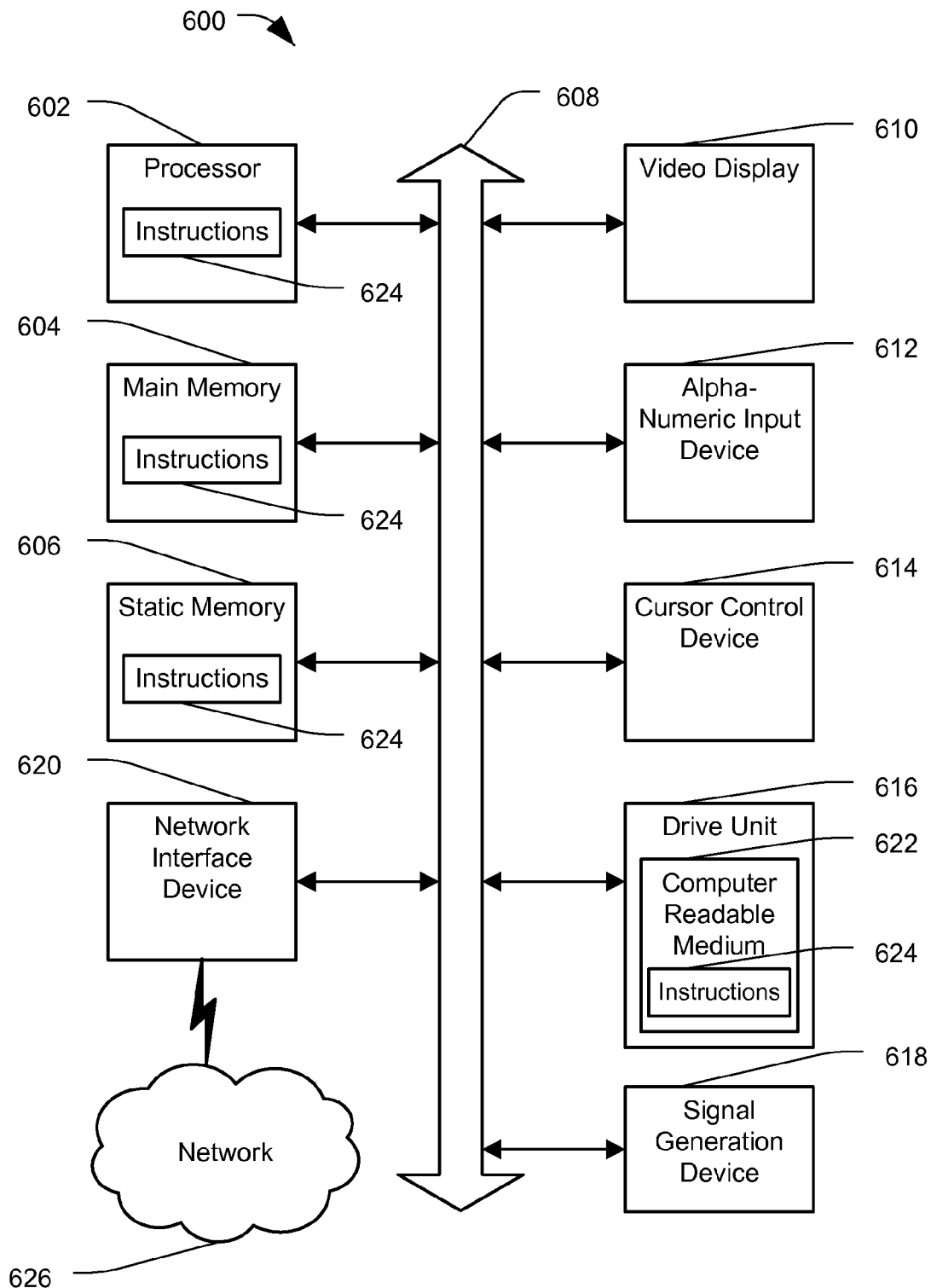
FIG. 6 is a block diagram of an illustrative embodiment of a general computer system.

Referring to FIG. 6, an illustrative embodiment of a general computer system is shown and is designated 600. For example, various components of the computer system 600 may include, implement, or be included within the residential gateway 102, the set-top box device 104, the television 106, the servers 110 and 118, the database 120, the devices 116 and 118, or any combination thereof.

The computer system 600 includes a set of instructions that can be executed to cause the computer system 600 to perform any one or more of the methods or computer based functions disclosed herein. The computer system 600, or any portion thereof, may operate as a standalone device or may be connected, e.g., using a network, to other computer systems or peripheral devices.

In a networked deployment, the computer system 600 may operate in the capacity of a set-top box device, a server, or a mobile computing device. The computer system 600 can also be implemented as or incorporated into various devices, such as a personal computer (PC), a tablet PC, a personal digital assistant (PDA), a mobile device, a palmtop computer, a laptop computer, a desktop computer, a communications device, a web appliance, or any other machine capable of executing a set of instructions (sequential or otherwise) that specify actions to be taken by that machine. In a particular embodiment, the computer system 600 can be implemented using electronic devices that provide voice, video or data communication. Further, white a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. As shown, the computer system 600 may further include or be coupled to a video display unit 610, such as a liquid crystal display (LCD), an organic light emitting diode (OLED), a flat panel display, a solid-state display, or a projection display. For example, the video display unit 610 may be television 106 of FIG. 1. Additionally, the computer system 600 may include an input device 612, such as a keyboard, a remote control device, and a cursor control device 614, such as a mouse. The computer system 600 can also include a disk drive unit 616, a signal generation device 618, such as a speaker or remote control device, and a network interface device 620. The network interface device 620 may be coupled to other devices (not shown) via a network 626.

In a particular embodiment, as depicted in FIG. 6, the disk drive unit 616 may include a computer-readable non-transitory medium 622 in which one or more sets of instructions 624, e.g., software, can be embedded. For example, the instructions 624 may enable the computer system 600 to perform one or more methods or logic described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable non-transitory media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/item distributed processing, and parallel processing. Alternatively, virtual computer system processing can be constructed to implement one or more of the methods or functionality as described herein.

The present disclosure contemplates a non-transitory computer-readable medium that includes instructions 624 so that a device connected to a network 626 can communicate voice, video or data over the network 626. Further, the instructions 624 may be transmitted or received over the network 626 via the network interface device 620. For example, the network 626 may be the network 108 of FIG. 1.

While the non-transitory computer-readable medium is shown to be a single medium, the terms "non-transitory computer-readable medium" and "non-transitory processor-readable medium" include a single medium or multiple media, such as a centralized or distributed database, and/or associated caches and servers that store one or more sets of instructions. The terms "non-transitory computer-readable medium" and "non-transitory processor-readable medium" shall also include any medium that is capable of storing a set of instructions for execution by a processor or that cause a computer system to perform any one or more of the methods or operations disclosed herein.

In a particular exemplary embodiment, the non-transitory computer-readable medium can include a solid-state memory such as a memory card or other package that houses one or more non-volatile read-only memories. Further, the non-transitory computer-readable medium can be a random access memory or other volatile re-writable memory. Additionally, the non-transitory computer-readable medium can include a magneto-optical or optical medium, such as a disk or tapes. Accordingly, the disclosure is considered to include any one or more of a non-transitory computer-readable storage medium and successor media, in which data or instructions may be stored.

It should also be noted that software that implements the disclosed methods may optionally be stored on a tangible storage medium. For example, the tangible storage medium may include a magnetic medium such as a disk or tape. As another example, the tangible storage medium may include a magneto-optical or optical medium such as a disk. As yet another example, the tangible storage medium may include a solid state medium such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet, other packet switched network transmission (e.g., TCP/IP, UDP/IP, HTML, X10, SIP, TR-069, INSTEON, WEP, Wi-Fi and HTTP) and standards for viewing media content (e.g., MPEG and H.264) may represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus comprising:
a network interface;
a processor coupled to the network interface; and
memory accessible to the processor, the memory comprising instructions that are executable by the processor to perform operations including:
accessing, in response to startup of a customer premise equipment device or a display device coupled to the customer premise equipment device, data descriptive of in-progress television programs available via a network coupled to the network interface;
receiving, from a server, an automatically generated rule associated with a startup screen, wherein the automatically generated rule is generated at the server based on user history information resulting from operation of the customer premise equipment device and based on additional information, wherein the additional information is based on information extrapolated from the user history information and based on external information that is not directly accessed by or provided to the customer premise equipment device;
determining whether the automatically generated rule is satisfied based on the data;
selecting a particular in-progress television program of the in-progress television programs based on whether the automatically generated rule is satisfied;
generating the startup screen, wherein at least a portion of the startup screen displays the particular in-progress television program; and
sending the startup screen to the display device.

2. The apparatus of claim 1, wherein the customer premise equipment device comprises a residential gateway device.

3. The apparatus of claim 1, wherein the customer premise equipment device comprises a set top box device.

4. The apparatus of claim 1, further comprising a display interface, wherein the operations further include sending the startup screen to the display device via the display interface.

5. The apparatus of claim 4, wherein the startup screen includes electronic program guide content.

6. The apparatus of claim 5, wherein the electronic program guide content is arranged in a particular order based at least in part on the automatically generated rule.

7. The apparatus of claim 1, wherein determining whether the automatically generated rule is satisfied includes using a pattern matching algorithm, and further comprising determining whether a user-defined rule is satisfied based on the data.

8. The apparatus of claim 1, wherein the processor is configured to generate the user history information by monitoring actions of a user.

9. The apparatus of claim 8, wherein the actions indicate that the user frequently accesses a particular program at a particular time.

10. The apparatus of claim 1, wherein the additional information comprises program content information.

11. The apparatus of claim 10, wherein the user history information is associated with a plurality of sporting event broadcasts, wherein the program content information is associated with a particular player associated with the plurality of sporting event broadcasts, and wherein the external information indicates that the particular player is scheduled to play in a subsequent sporting event that is scheduled for broadcast.

12. The apparatus of claim 1, wherein the operations further comprise:
identifying an unviewed television program that satisfies the automatically generated rule, wherein the unviewed television program is available on-demand via the network; and
including an alert indicating the unviewed television program as part of the startup screen.

13. A method, comprising:
at a customer premise equipment device, in response to startup of the customer premise equipment device or a display device coupled to the customer premise equipment device, accessing data descriptive of in-progress television programs available via a network coupled to a network interface of the customer premise equipment device;
receiving, at the customer premise equipment device from a server, an automatically generated rule associated with a startup screen, wherein the automatically generated rule is generated at the server based on user history information resulting from operation of the customer premise equipment device and based on additional information, wherein the additional information is based on information extrapolated from the user history information and based on external information that is not directly accessed by or provided to the customer premise equipment device;
determining, at the customer premise equipment device, whether the automatically generated rule is satisfied based on the data;
selecting, at the customer premise equipment device, a particular in-progress television program of the in-progress television programs based on whether the automatically generated rule is satisfied;
generating the startup screen, wherein at least a portion of the startup screen displays the particular in-progress television program; and
sending the startup screen to the display device.

14. The method of claim 13, further comprising generating the user history information by monitoring actions of a user, wherein the actions indicate that the user frequently accesses a particular program at a particular time.

15. The method of claim 14, further comprising:
when a second particular in-progress television program is available or about to be available via a transmission, displaying an alert via the display device, automatically tuning the customer premise equipment device to a channel associated with the second particular in-progress television program, or any combination thereof, wherein the second particular in-progress television program is selected based on a determination that the automatically generated rule is not satisfied; and
when the transmission of the second particular in-progress television program has ended, displaying an option to access a recorded version of the second particular in-progress television program.

16. The method of claim 15, wherein the recorded version of the second particular program is accessible via the network coupled to the customer premise equipment device and wherein the alert comprises a short message service alert, an e-mail alert, or any combination thereof.

17. The method of claim 13, wherein the additional information is determined based on analyzing the user history information at the server.

18. The method of claim 17, wherein analyzing the user history information includes identifying a particular event, and wherein the external information includes an indication of the particular event.

19. A computer-readable storage device comprising instructions that, when executed by a processor, cause the processor to perform operations including:
generating user history information by monitoring actions of a user, wherein the actions indicate that the user frequently accesses a particular program at a particular time;
in response to startup of a customer premise equipment device or a display device coupled to the customer premise device, accessing data descriptive of in-progress television programs available via a network coupled to the customer premise equipment device;
receiving, from a server, an automatically generated rule associated with a startup screen, wherein the automatically generated rule is generated at the server based on user history information resulting from operation of the customer premise equipment device and based on additional information, wherein the additional information is based on information extrapolated from the user history information and based on external information that is not directly accessed by or provided to the customer premise equipment device;

determining whether the automatically generated rule is satisfied based on the data;

selecting a particular in-progress television program of the in-progress television programs based on whether the automatically generated rule is satisfied;

generating the startup screen, wherein at least a portion of the startup screen displays the particular in-progress television program; and sending the startup screen to the display device.

20. The computer-readable storage device of claim 19, wherein the operations further include sending, to the display device, a prompt to sign up to participate in a social network.

* * * * *